US011972377B1

(12) United States Patent
Garg et al.

(10) Patent No.: US 11,972,377 B1
(45) Date of Patent: Apr. 30, 2024

(54) USER INTERFACE FOR FLEET ROUTING SYSTEM

(71) Applicant: ZUM SERVICES, INC., Redwood City, CA (US)

(72) Inventors: Abhishek Garg, Redwood City, CA (US); Rohit Jain, Redwood City, CA (US); Sidi Liu, Redwood City, CA (US); Andrew Mormysh, Redwood City, CA (US); Gustavo Ocasio, Redwood City, CA (US); Niket Sanghvi, Redwood City, CA (US); Melissa Shiu, Redwood City, CA (US)

(73) Assignee: Zum Services, Inc., Redwood City, CA (US)

( * ) Notice: Subject to any disclaimer, the term of this patent is extended or adjusted under 35 U.S.C. 154(b) by 0 days.

(21) Appl. No.: 18/211,387

(22) Filed: Jun. 19, 2023

(51) Int. Cl.
*G06Q 10/00* (2023.01)
*G06Q 10/0631* (2023.01)
*G06Q 50/30* (2012.01)

(52) U.S. Cl.
CPC ....... *G06Q 10/06312* (2013.01); *G06Q 50/30* (2013.01)

(58) Field of Classification Search
None
See application file for complete search history.

(56) References Cited

U.S. PATENT DOCUMENTS

| 10,677,603 | B1* | 6/2020 | Kelly | G08G 1/202 |
| 2013/0304347 | A1* | 11/2013 | Davidson | G06Q 10/08 |
| | | | | 701/99 |
| 2019/0219417 | A1* | 7/2019 | Quint | G01C 21/3632 |
| 2021/0248704 | A1* | 8/2021 | Wang | G06Q 50/265 |
| 2021/0270631 | A1* | 9/2021 | Spielman | G01C 21/3623 |
| 2021/0302181 | A1* | 9/2021 | Civitella | G01C 21/3461 |

OTHER PUBLICATIONS

J. Wang and X. Huang, "Routing school bus for better student learning," 2017 25th International Conference on Geoinformatics, Buffalo, NY, USA, 2017, pp. 1-7, doi: 10.1109/GEOINFORMATICS. 2017.8090947. (Year: 2017).*

* cited by examiner

*Primary Examiner* — Matheus Ribeiro Stivaletti
(74) *Attorney, Agent, or Firm* — Travis Banta; Loyal IP Law, PLLC

(57) ABSTRACT

A graphical user interface and a system are provided which include a route identification interface element which specifies a new route for a vehicle, a plurality of route type buttons, a vehicle type interface, a stop order interface, a map, a control button, and an assignment button. The stop order interface identifies one or more stops for a vehicle in a fleet of vehicles. The map identifies the new route and the one or more stops graphically on the graphical user interface. The control button provides a utilization view for the one or more vehicles in the fleet of vehicles from which a vehicle from the one or more vehicles in the fleet of vehicles that are available can be assigned to the new route.

20 Claims, 8 Drawing Sheets

USER INTERFACE FOR FLEET ROUTING SYSTEM

TECHNICAL FIELD

The present application discloses a user interface for systems for routing a fleet of vehicles, scheduling stops, and optimizing those routes and stops based on one or more elements of primary concern.

BACKGROUND

The earliest advent of a fleet of vehicles likely dates back to antiquity when vehicles became necessary for the transport of people and goods. Fleets of boats are known to have existed in ancient Greece while fleets of chariots were known to have been used in ancient wars both as vehicles of war and as transport vehicles for soldiers and supplies. Even horses themselves have been used for the purpose of transporting people and goods. Indeed, many ancient stories of certain battles turn on the use of fleets of vehicles and their relative coordination in both timing and goals to the win or loss of a battle.

In the more recent past, trains, sail powered boats, and ocean liners were assembled into fleets for both military and civilian use. Since trips across continents or across oceans were typically of an extended duration, schedules and stops for these vehicles, especially in the context of civilian use, were published well in advance of an actual date of embarkation. These dates and schedules were largely accurate given the need to be at a next stop or location in a certain amount of time. Many ocean liners, for example, stopped in multiple ports to pick up passengers and goods before transporting both across the ocean. Trains kept a specific schedule on a time duration basis. For example, a train may leave from Paris for Berlin every other day allowing time for a day to make the trip from Paris to Berlin and a day to make the trip back. At the same time, other trains may have traveled from Trenton, New Jersey to New York City, New York several times per day. Historically, these schedules were based on the number of vehicles available and on the travel time necessary for trips between stops.

The advent of the modern automobile changed transportation all across the world on seemingly an overnight basis, at least in retrospect. Motorized land based transportation without the aid of rails made automobiles the transport method of choice for anything that was not too heavy or far away. Trucks could easily carry people and goods over short distances with very little notice, which was a major development for transportation. Buses became the vehicle of choice for transporting people as buses were fitted with seats for people. Trucks became the vehicle of choice for transporting goods from one place to another. As the relative prices of automobiles decreased and World Wars broke out, automobile fleets came into existence. Fleets of buses took passengers to places where rails did not exist while fleets of trucks took goods from boats in the harbor to soldiers fighting inland.

Fleet logistics became an issue of major importance to military and civilian fleet owners alike. It became imperative to ensure that certain vehicles were available for certain transportation tasks on a periodic basis, whether that basis was a multiple times per day basis, a day to day basis, a weekly basis, or some other periodic basis. Automobiles became different from fleet vehicles such as trains, boats, and other ocean going vessels because automobiles could schedule multiple trips per day while making repeated visits to a logistical hub or supply center. The pace at which trucks could supply goods outstripped anything that was previously known to human civilization and made the delivery of goods possible at scale. Buses developed scheduled times and routes for conveying passengers along certain routes at certain times.

Today, massive fleets of vehicles are owned by both governmental and private institutions to facilitate the transport of goods and passengers, which is a major logistics endeavor. Fleet vehicles may have routes which are traveled on a periodic basis to serve customers in various capacities. For example, mail is delivered to virtually every home in the United States on a daily basis by mail carriers in individual trucks. Other private mail or companies and goods delivery companies also have fleets of trucks to provide mail service for individual customers. Similarly, local governmental entities operate bus lines for mass transit of passengers, typically in and out of big cities. Public bus lines, for example, use main routes with spurs that serve residential areas of a city to facilitate passengers traveling into and out from the city on a daily basis. Both public and private schools operate bus lines to safely transport children to and from school on a daily basis. School buses, however, usually operate based on stopping at certain places at certain times to safely load children to attend local schools and, for that reason, travel routes that are based on where children live, generally speaking.

Logistics for these fleets are incredibly complex, which has been a persistent problem since antiquity. Horse cavalry attacking at the wrong time on an ancient Greek battlefield and buses arriving off schedule are different implementations of the same problem spread thousands of years apart. Maintenance, location, routing, fueling, and driver support are also considerations for fleet vehicles in order to deliver passengers or goods to a particular place by a particular time. In the context of school buses, a bus may be late because of a breakdown, construction delays, fuel problems, or a missing driver which may cause a child to be late for school. Further, school buses may serve redundant routes, which could be accommodated by a single bus, which increases the relative costs of providing bus services on virtually a daily basis. Those costs may include pollution due to emissions, fuel costs, driver costs, costs in time, and others. Current solutions are not only inefficient but wasteful and contribute to cumulative emissions based environmental harm. Optimization is needed to reduce financial, pollution, and time costs in fleet vehicle use and routing.

It is, therefore, one object of this disclosure to provide a user interface that facilitates a routing system which optimizes routes for fleet vehicles. It is another object of this disclosure to provide a user interface for a routing system which optimizes routing and stop timing for fleet vehicles across an entire vehicle fleet.

SUMMARY OF THE DISCLOSURE

A graphical user interface is provided which include a route identification interface element which specifies a new route for a vehicle, a plurality of route type buttons, a vehicle type interface, a stop order interface, a map, a control button, and an assignment button. The stop order interface identifies one or more stops for a vehicle in a fleet of vehicles. The map identifies the new route and the one or more stops graphically on the graphical user interface. The control button provides a utilization view for the one or more vehicles in the fleet of vehicles from which a vehicle from the one or more vehicles in the fleet of vehicles that are available can be assigned to the new route.

A system provides a graphical user interface displayed on a device screen associated with a user. The user may be a provider, an administrator, or a ride requestor. The graphical user interface may include a route identification interface element which specifies a new route for a vehicle, a plurality of route type buttons, a vehicle type interface, a stop order interface, a map, a control button, and an assignment button. The stop order interface identifies one or more stops for a vehicle in a fleet of vehicles. The map identifies the new route and the one or more stops graphically on the graphical user interface. The control button provides a utilization view for the one or more vehicles in the fleet of vehicles from which a vehicle from the one or more vehicles in the fleet of vehicles that are available can be assigned to the new route.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where:

FIG. 2 illustrates an exemplary embodiment of a user interface executed by the fleet routing system.

FIG. 4 illustrates an exemplary embodiment of a user interface providing a fleet based utilization view in the fleet routing system.

FIG. 6 illustrates an exemplary embodiment of a user interface illustrating a view of fleet routes with menu for editing route details in the fleet routing system.

FIG. 7 illustrates an exemplary embodiment of a user interface for editing route details in the fleet routing system.

DETAILED DESCRIPTION

The disclosure extends to vehicles of all types which are assembled into a fleet for a common purpose or goal such as, but not limited to, delivering passengers, delivering goods, or any other purpose.

In the following description of the disclosure, reference is made to the accompanying drawings, which form a part hereof, and in which is shown by way of illustration specific implementations in which the disclosure is may be practiced. It is understood that other implementations may be utilized and structural changes may be made without departing from the scope of the disclosure.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
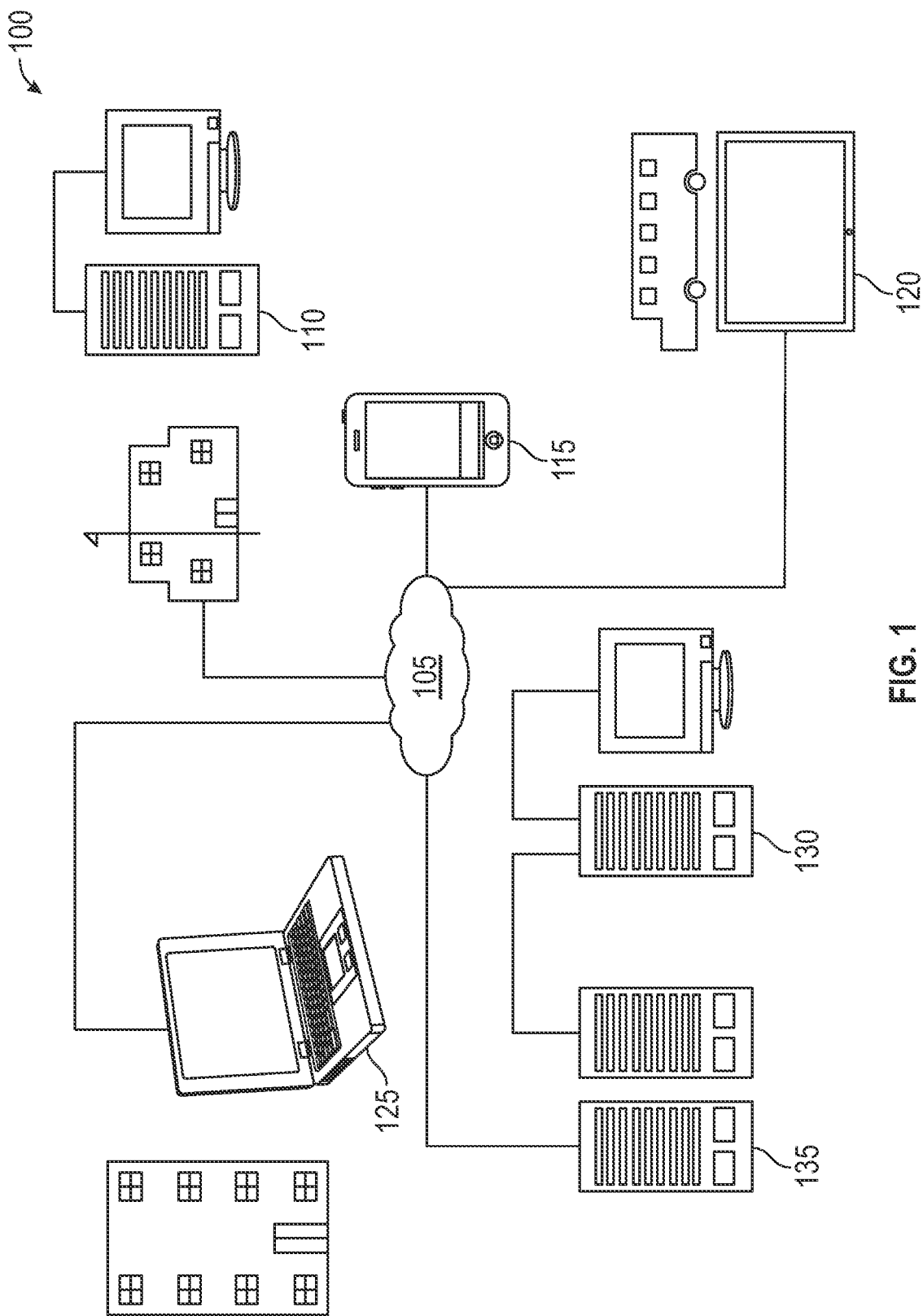
FIG. 1 illustrates box diagram of a fleet routing system.

FIG. 1 illustrates a box diagram of a fleet routing system 100. Fleet routing system may be implemented by use of a communications network 105 such as the Internet, which facilitates the exchange of information between various devices within fleet routing system 100. Fleet routing system may be used with any fleet but is described with respect to a fleet of school buses. The techniques disclosed herein may be used to deliver passengers or goods with little or no modification. Fleet routing system 100 may be implemented between a ride requestor device, such as a school device 110 (and/or an administration level device 125, which will be discussed below) and a user device 115, and a driver device 120 associated with a bus driver, for example. Fleet routing system 100 may be implemented by an administrator device 125. A provider may provide the administrator device 125 or the ride requestor device 110 with access to fleet routing system 100 by use of servers 135 and provider device 130. In one implementation, a school district may use administration level device 125 which provides buses to pick up and deliver children to a school and operate in a manner similar to ride requestor device 110. In other embodiments, ride requestor device 110 may be implemented to schedule routing for bus routes for a particular school. In other words, various levels of administration may access and implement fleet routing system 100 according to their particular needs for the delivery of passengers.

At the outset, a provider device 130 may give a ride requestor device 110 or an administrator level device 125 access to fleet routing system 100 by servers 135 to create bus routing for a particular school district or school as appropriate. Servers 135 may provide a user interface to ride requestor device 110 or an administrator level device 125 to create routes for each child in the district or school as appropriate. For example, a profile may be created for each child in the district or school as appropriate to be stored in non-volatile non-transitory storage media, which includes a home address for each child. In response, fleet routing system 100 may determine a distance between identified stops and a travel time between each of those identified stops to determine both a single bus route and a number of buses required for a necessary number of routes. For example, based on a standard bus configuration, a school bus may transport 80 seated students. However, due to time and distance constraints, a certain bus may only be able to pick up 45 students at identified stops. The identified stops may be based on ensuring a child does not cross a road or lives within a certain distance of the identified stop. If one location is heavily populated with children who need to board a school bus, optimized routing may determine that since more children are boarding per identified stop, that particular school bus may need less time to complete an assigned route. In one embodiment, fleet routing system 100 may optimize routes based on the shortest time on the road for each bus, based on minimal fuel usage across the fleet, based on minimal emissions across the fleet, based on or any other basis that is meaningful to the school or community served by the school.

Once the routes are generated with children assigned to a particular bus, server 135 may transmit bus information to user device 115 by fleet routing system 100. Bus information may include bus stop information for picking up a child and a time for pick up at the bus stop. User device 115 may be associated with the child bus rider or with a parent of the child bus rider. User device 115 may be implemented as separate devices where one device is associated with the child rider and another device is associated with a parent, guardian, or other supervisor of a child. When the school bus is operating, a real time location may be provided to user device 115 so that the child and child supervisor may identify where the bus is currently located. A child or child supervisor may use user device 115 to create the child profile discussed above by providing information from user device 115 through communications network 105 to server 135.

Further, once the routes are generated, server 135 may transmit individual route information to a bus driver via driver device 120, in fleet routing system 100. Individual route information may be a mandatory bus route for the driver to follow with a stop sequence that is identified along the individual route. Individual route information may include turn by turn instructions with expected drive time duration and distance for the bus driver. Driver device 120 may also detect information from a particular bus drive and provide that information to server 135 through communication network 135. Information provided from driver device 120 may include distance traveled information, fuel use information, pickup duration information, bus stop location information (e.g., information about where the stop is designated versus where the stop actually occurred), speed of travel information (in terms of actual speeding and in terms of slowdowns caused by traffic, construction, or any other road condition), rider verification information, rider disembarking information, and any other information that may be used by server 135 to optimize routing. In one embodiment, driver device 120 may receive an optimized route from server 135 for picking up children based on a home or a school address and/or prior pickup/drop off history locations for children on a particular route. In another embodiment, driver device 120 may further be optimized to prevent U-turns, enforce curbside pickup to avoid children crossing streets. Server 135 may receive information from driver device 120 which it may use to optimize routes based on learning from past driver routes to determine a best path between stops. Server 135 may receive information from driver device 120 which may optimize based on learned roadblocks and driver input to driver device 120 with new information (e.g., a street closure or construction) which causes server 135 to reoptimize the bus route. Server 135 may use information to determine and store driving instructions at the ride route level for a particular bus and driver device 120. Server 135 may track a bus via driver device 135 during a pickup or drop off ride and ensure compliance with the optimized route. If driver device 120 indicates that a bus is not following optimized route information, server 135 may send a message to ride requestor device 110, administrator device 125, or provider device 130 to allow either the ride requestor, the administrator, or the provider to contact the bus driver with route correction instructions.

Based on information received from driver device 120, server device 135 may maintain estimated global positioning system ("GPS") waypoints and an estimated time of arrival ("ETA") information for each ride, which may be constantly updated based on information provided by driver device 120. Driver device 120 may further provide real-time routing, navigation, and path information based on a current location of driver device 120. Routing, navigation, and path information may be displayed on a screen associated with driver device 120. The user may receive, via user device 115, expected vehicle path information on a map displayed on a screen of user device 115. Thus, a user of user device 115 may be able to track bus 120 in real-time and observe where a bus is currently and when a bus will be at a specific stop, which may be identified by waypoints provided to the user from server 135 via user device 115. Any data received from driver device 120 may be stored as historical data which may be used to further optimize bus routing on a permanent or temporary basis depending on road conditions, pickup/drop off requirements, and any other factor identified herein.

Ride requestor device 110, user device 115, driver device 120, administrator device 125, and provider device 130 may be implemented as any electronic device with processing power sufficient to share electronic information back and forth through communications network 105. Examples of ride requestor device 110, user device 115, driver device 120, administrator device 125, and provider device 130 include mobile phones, desktop computers, laptop computers, tablets, game consoles, personal computers, mobile devices, notebook computers, smart watches, and any other digital device that has the processing ability to interact with server 135.

Ride requestor device 110, user device 115, driver device 120, administrator device 125, and provider device 130 may include software and hardware modules that execute computer operations, communicate with communication networks 105 and server 135. Further, hardware components may include a combination of Central Processing Units ("CPUs"), buses, volatile and non-volatile memory devices, storage units, non-transitory computer-readable storage media, data processors, processing devices, control devices transmitters, receivers, antennas, transceivers, input devices, output devices, network interface devices, and other types of components that are apparent to those skilled in the art. These hardware components within ride requestor device 110, user device 115, driver device 120, administrator device 125, and provider device 130, are used to connect with server 135.

Server 135 may provide web-based access to fleet routing system 100 (or relevant portions based on which device is associated with a particular function—e.g., a parent using user device 115 may not have permissions to reroute buses) to ride requestor device 110, user device 115, driver device 120, administrator device 125, and provider device 130. Communication network 105 may be a wired, wireless, or both and facilitate communications in fleet routing system 100. Server 135 may include cloud computers, super computers, mainframe computers, application servers, catalog servers, communications servers, computing servers, database servers, file servers, game servers, home servers, proxy servers, stand-alone servers, web servers, combinations of one or more of the foregoing examples, and any other computing device that may be used to execute optimized routing and communication for web based fleet routing system 100. Server computer 135 may be implemented as one or more actual devices but are collectively referred to as server computer 135 may include software and hardware modules, sequences of instructions, routines, data structures, display interfaces, and other types of structures that execute server computer operations. Further, hardware components may include a combination of Central Processing Units ("CPUs"), buses, volatile and non-volatile memory devices, storage units, non-transitory computer-readable storage media, data processors, processing devices, processors, control devices transmitters, receivers, antennas, transceivers, input devices, output devices, network interface devices, and other types of components that are apparent to those skilled in the art. These hardware components within one or more server 135 may be used to execute the various methods or algorithms disclosed herein, and interface with ride requestor device 110, user device 115, driver device 120, administrator device 125, and provider device 130.

In one embodiment, ride requestor device 110, user device 115, driver device 120, administrator device 125, and provider device 130 may access server 135 by a communication network 105. In each case, wireless communication network 135 connects ride requestor device 110, user device 115, driver device 120, administrator device 125, and provider device 130 via an internet connection provided by communication network 105. Any suitable internet connection may be implemented for wireless communication network 105 including any wired, wireless, or cellular based connections. Examples of these various internet connections include implementations using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a 5G network and its successors, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between, ride requestor device 110, user device 115, driver device 120, administrator device 125, and provider device 130 and server 135.

Figure 2:
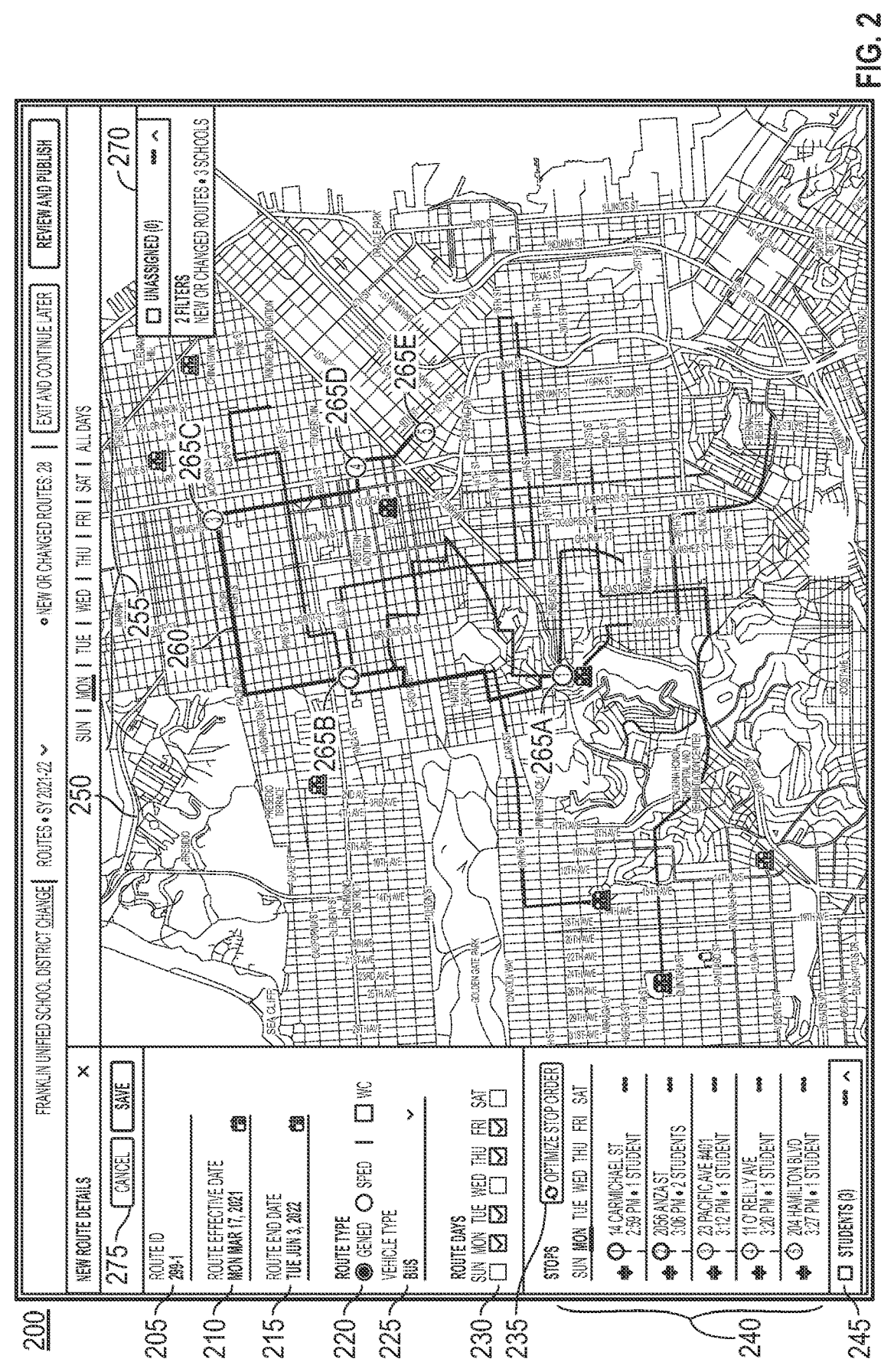

FIG. 2 illustrates an exemplary embodiment of a user interface 200 executed by fleet routing system 100. As shown in FIG. 2, user interface 200 allows a user to create a new route for a particular vehicle in a fleet of vehicles. As previously mentioned, the disclosure herein uses buses, particularly school buses, as an exemplary of a fleet of vehicles. However, the disclosure herein is not limited solely to school buses or buses in general. Any fleet of vehicles may benefit from the techniques described herein. Typically, user interface 200 may be provided from server 135 to provider device 130, administration device 125, or ride requestor device 110. A provider, administrator, or ride requestor may use fleet routing system 100 to create passenger or goods delivery/transportation routes for a particular entity which, in this case, is identified as Franklin Unified School District, although the particular entity could also be a business that delivers goods, a mail company, a fleet based transportation company, trucking company, or any other company that uses a fleet of vehicles to perform services provided by that company.

As shown in user interface 200, a provider/administrator/requestor user may identify a new route in interface element 205, a date for the new route to start in interface element 210, and a date for the new route to end in interface element 215. Dates shown are for a portion of a school year and are historical merely for explanation based on a previously existing route. User interface 200 may further include route type buttons 220 which allow a provider/administration/requestor user to select a type of route, such as a general education route, a special education route, or identify the need of a wheelchair for a particular route. User interface 200 may also allow a provider/administrator/requestor user to select a desired vehicle type such as a bus, a van, a short bus, a city bus, a truck, or any other type of fleet vehicle for the particular route. The provider/administrator/requestor user may further select the days of the week on which the route should be driven by the selected vehicle.

Optimize button 235 may allow a user to optimize the various stops identified for the particular route. In this case, a plurality of stops 240 are identified from a historical route as well as a plurality of students 245 associated with that plurality of stops 240. The stop order may be optimized based on a variety of factors, including minimal driving time, minimal time on the road, minimal emitted emissions, minimal fuel use, or any other factor relevant to the community in which the services are provided. At the same time, user interface 200 provides a map 250 which may be changed or selected based on selecting a day (or plurality of days) from map interface buttons 255. Map 250 may illustrate route 260 for the new route identified in user interface element 205 and a plurality of stops 265A-265E shown in the list of the plurality of stops 240. The order of stops 265A-265E may be changed based on a user optimizing the stop locations using optimize button 235. User interface 200 may further provide a list of unassigned riders 200 (or goods in other examples) who or which need to be assigned to route 260. When information has been provided through user interface 200, a user may choose to use control buttons 275 (e.g., a cancel button or a save button) to save and publish the new route to fleet routing system 100.

Figure 3:
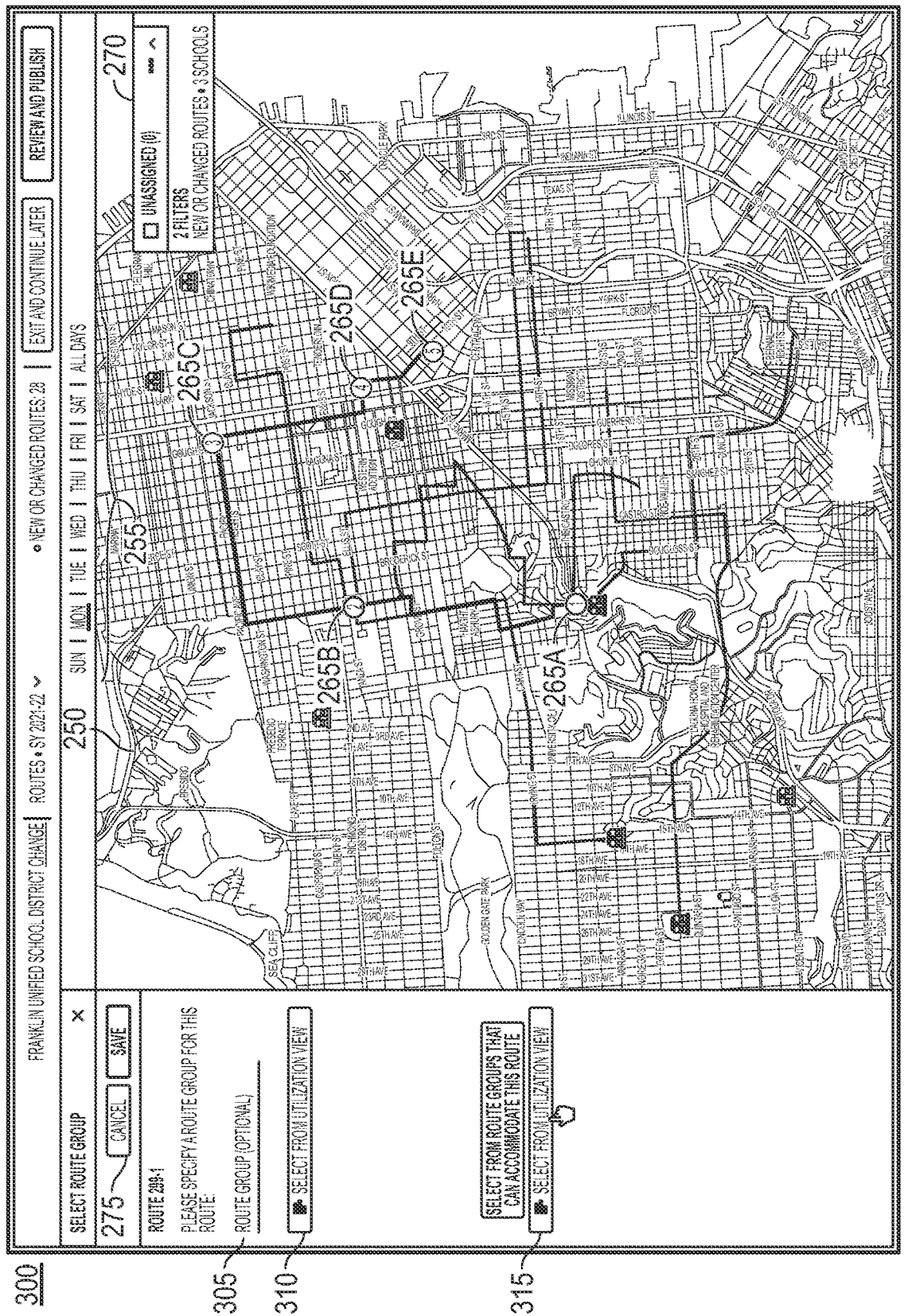
FIG. 3 illustrates an exemplary embodiment of a user interface providing access to a fleet based utilization view in the fleet routing system.

FIG. 3 illustrates an exemplary embodiment of a user interface 300 for provided access to a fleet routing system 100. In response to a user saving and publishing the new route to fleet routing system 100 in FIG. 2, fleet routing system 100 may cause a provider 130/administrator 125/requestor 110 device to provide a selection of a particular vehicle to drive according to the selected route. For example, user interface 300 may identify a route group vehicle by user interface element 305 or select a utilization view button 310 to see which vehicles are available to drive the route if no particular vehicle is known. Alternatively, the provider/administrator/requestor user may use their respective devices 130/125/110 to select another utilization view bottom 315 which provides a view of only those vehicles which are able to accommodate driving the route specified in user interface 200 on the specific days (and times) specified in user interface 200.

User interface 300 may also provide a user with a view of a map 250, which may be changed or selected based on selecting a day (or plurality of days) from map interface buttons 255. Map 250 may illustrate route 260 for the new route identified in user interface element 205 and a plurality of stops 265A-265E shown in the list of the plurality of stops 240, as discussed with respect to FIG. 2. User interface 200 may further provide a list of unassigned riders 200 (or goods in other examples) who or which need to be assigned to route 260. When information has been provided through user interface 300, a user may choose to use control buttons 275 (e.g., a cancel button or a save button) to save and publish the new route to fleet routing system 100 or select utilization view button 310 or second utilization view button 315 to view utilization views of fleet vehicles.

Figure 4:
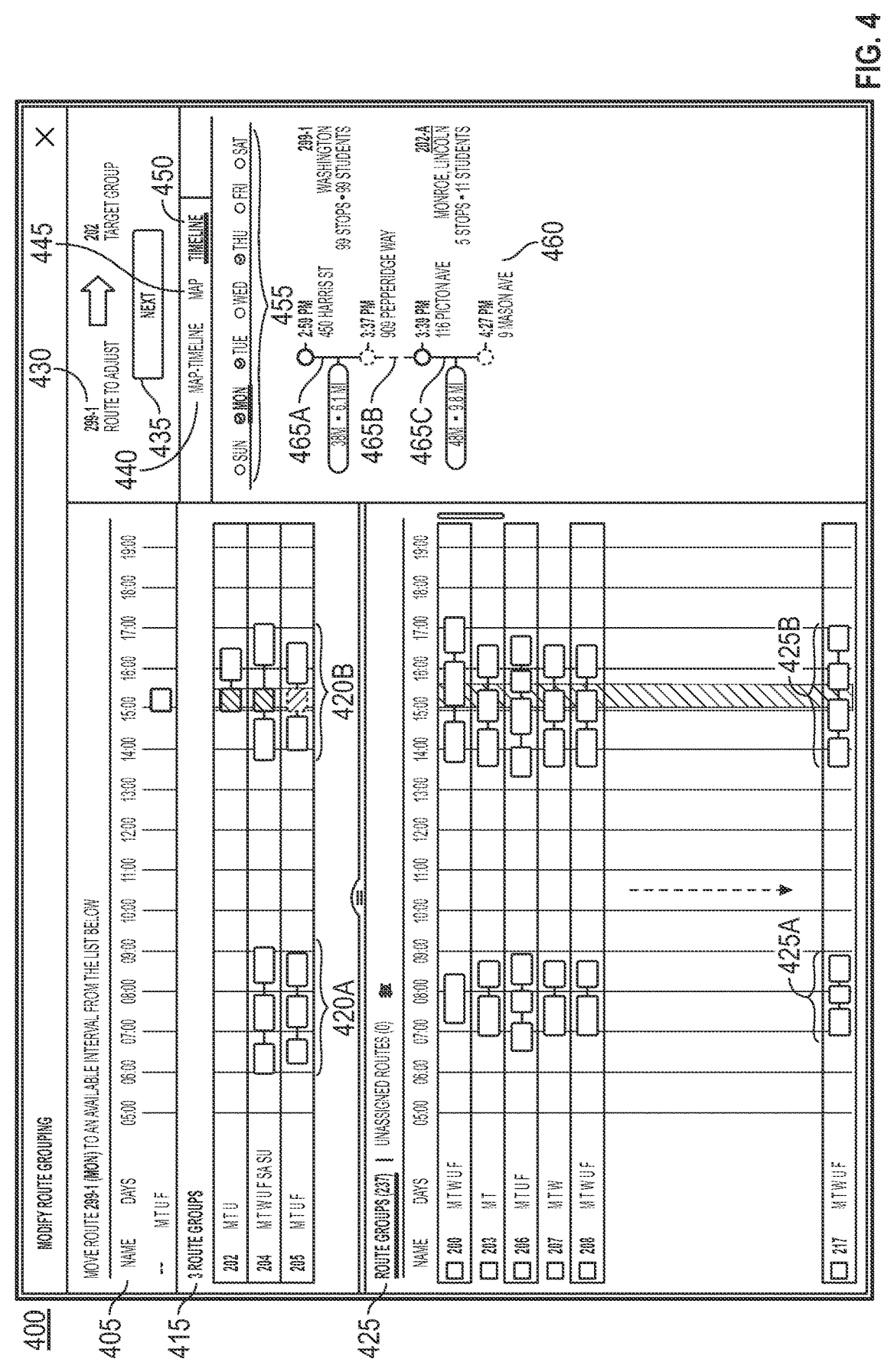

FIG. 4 illustrates an exemplary embodiment of a user interface 400 for providing a fleet based utilization view in fleet routing system 100, shown in FIG. 1. As shown in FIG. 4, a new route, route 299-1 identified in interactive element 205 of FIG. 2, is identified as operating on Mondays, Tuesdays, Thursdays, and Fridays (as shown in interactive element 230 in FIG. 2) in route identifier 405. Route identifier 405 also shows that route 299-1 is to be driven beginning at 14:59 to 15:38. If a user interacts with second utilization view button 315, the user may be provided with route groups 415 which illustrate current routes for each of the available vehicles, vehicle numbers 202, 204, and 205 (e.g., as a fleet vehicle number or a bus number). Each one of vehicles 202, 204, and 205 has an opening between 14:59 and 15:38 on Mondays, Tuesdays, Thursdays, and Fridays. In other words, vehicles 202, 205, and 205 have availability to accommodate a new route, such as route 299-1 at the time identified.

As shown in FIG. 4, each of the routes may be shown in a utilization view to visually illustrate the routes for each vehicle and the times of each individual route. For example, utilization indicators 420A illustrate that vehicle number 202 has no morning routes while vehicle numbers 205 and 205 both have morning routes at a particular amount of time. Utilization indicators 420B for vehicle numbers 202, 204, and 205 illustrate how the route timing for vehicle numbers 202, 204, and 205 may accommodate a new route, such as route 299-1 with a color coding scheme. For example, illustrating route 299-1 as a green block in route groups 415 indicates that route 299-1 would be satisfactory for providing a ride a particular location, time, and day. An orange block in route groups 415 indicates that route 299-1 is available but impractical due to time constraints to add because of travel time between a last stop of a previous route and a next stop of a subsequent route.

If a user interacts with utilization view button 310, the user may be provided with route groups 425 which illustrate current routes for each of all vehicles, vehicle numbers 200, 202, 203, 204, 205, 206, 207, 208 . . . 217 (e.g., as a fleet vehicle number or a bus number). Each of the routes may be shown in a utilization view to visually illustrate the routes for each vehicle and the times of each individual route for every vehicle in the fleet in route groups 425, effectively combining route groups 415 and 425 as shown in FIG. 4. For example, utilization indicators 425A illustrate that vehicle numbers 202, 204, and 205 have availability for a new route, while also illustrating utilization for vehicle numbers 200, 203, 206, 207, 208, . . . 217 for morning routes. Utilization indicators 425B for vehicle numbers 202, 204, and 205 illustrate how the route timing for vehicle numbers 202, 204, and 205 may accommodate a new route, such as route 299-1, but also illustrate that vehicle numbers 200, 203, 206, 207, 208 . . . 217 have routes or travel between routes that are either overlapping the times or days required by route 299-1. A color coded bar may be provided within route 425B, that corresponds to route 299-1 illustrating the potential overlap in travel time between routes or routes themselves which is overlaid by the routes for each individual fleet vehicle to provide a visual representation of which vehicles could or could not accommodate a new route, such as route 299-1. The color coded bar may illustrate a duration of route 299-1 and show that other vehicles are being utilized during that particular route duration for route 299-1.

User interface 400 may further provide an overview element 430 which illustrates to a provider/administrator/ requestor user that the provider/administrator/requestor user is attempting to add a new route, route 299-1 to vehicle 202 and provide an assignment button 435 to create and assign the new route to a vehicle. User interface 400 may further provide a visual representation of a map and timeline with map-timeline button 440, a map by map button 445, and a timeline by timeline button 450 which may provide a provider/administrator/requestor user with visual information about how the new route 299-1, would look if route 299-1 was assigned to vehicle 202. As shown in FIG. 4, timeline button 550 is selected which may then be augmented by selecting a daily view button 455 to provide a display of a route for vehicle 202 which incorporates new route 299-1 while also providing the originally assigned route, 202A. Timeline view 460 illustrates that on Mondays, route 299-1 (element number 465A) begins at 2:49 pm at 450 Harris St., has a duration of 38 minutes over a distance of 6.1 miles and has 99 stops with 99 students, as merely an explanatory route. Route 299-1 ends at 3:37 pm at 909 Pepperidge Way and begins to travel (element 465B) to the next pickup location at 3:39 at 116 Picton Avenue for route 202-A. At 116 Picton Avenue, route 202-A commences (element 465C) to drive for 48 minutes over a distance of 9.9 miles across 5 stops for 11 students. Route 202-A ends at 9 Mason Avenue at 4:27 PM. Timeline view 460 may be color coded such that route 299-1 (element 465A) may be blue, while route 202-A (element 465C) may be purple, for example. The color coding may be used on a map view if map button 445 is selected such that the route in the timeline and the route in the map are illustrated as being in the same color for representative consistency.

Figure 5:
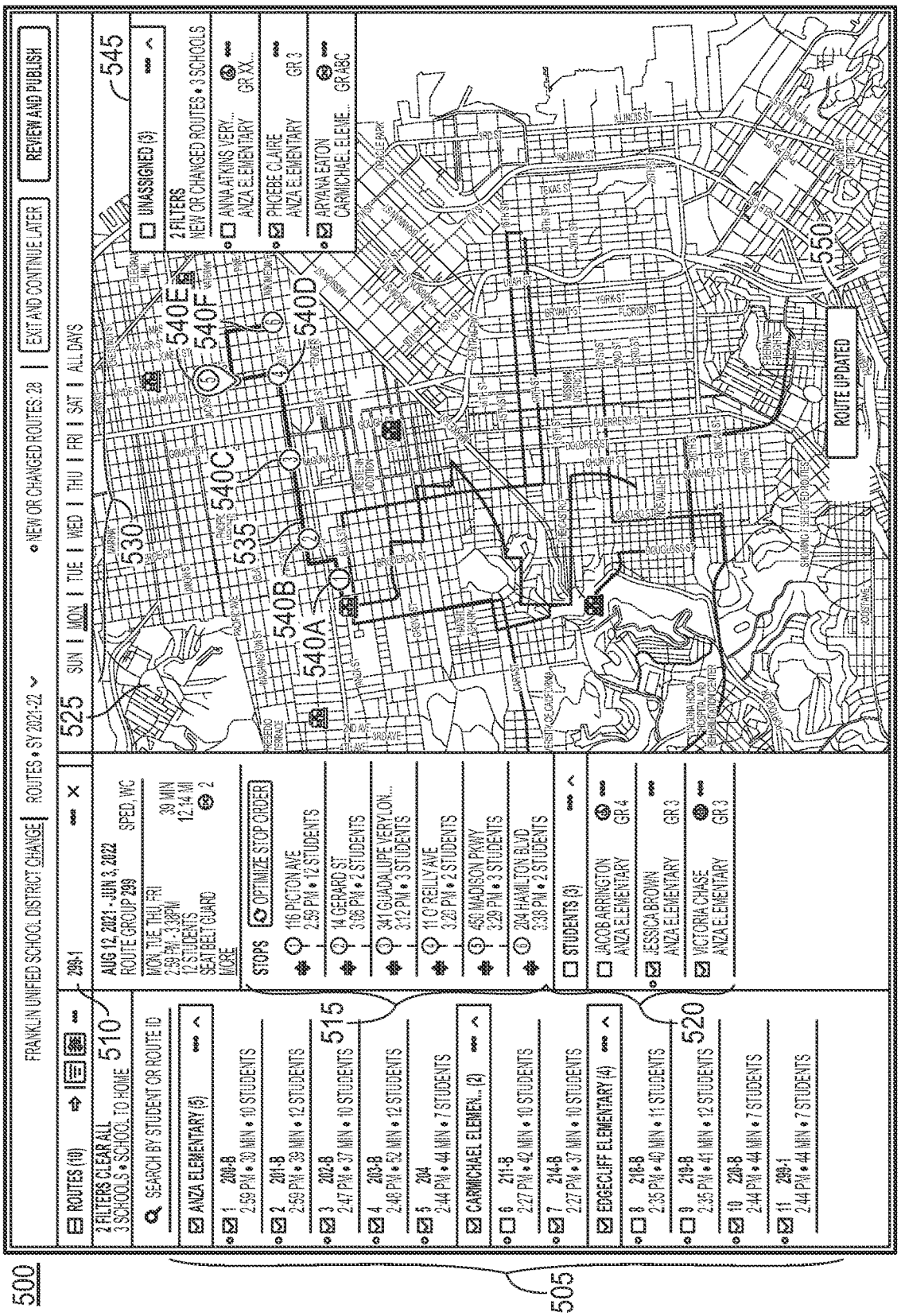
FIG. 5 illustrates an exemplary embodiment of a user interface illustrating a view of fleet routes in the fleet routing system.

FIG. 5 illustrates an exemplary embodiment of a user interface 500 illustrating a view of fleet routes in fleet routing system 100. User interface 500 illustrates a view of all fleet routes for a particular entity. As previously discussed, an entity could be any governmental entity or company that operates a fleet of vehicles, although as shown in FIG. 5, an exemplary bus route is provided on, for example, a provider device 130 or an administrator device 125 where the administrator is an administrator of the entity. As shown in FIG. 5, a district administrator may view bus routes across a school district, although an individual school may also be shown and made available to a ride requestor device 110 through server 135 as well.

User interface 500 provides route information interface 505 for a plurality of elementary schools, including route 299-1, which was created as shown in FIG. 4, as route number 299-1 of route information interface 505. Route number 299-1 is selected as the desired information from route information interface 505. As such, detailed information for route 299-1 is provided in route details interface 299-1. Route details interface 510 provides information about the route creation date, the route group number, the requirements associated in terms of special education and wheelchair access. Route details interface 510 may also include information about the days of the week and times of the day that a particular rout is run, the duration of the route, the distance of the route, the number of students of the route and any more information available based on provider/ administration interaction with route details interface 510.

Route stops information may be provided as route stops interface 515 which may provide a list of stops, in an optimized order for a particular route, which may be optimized, as discussed above. Student information interface 520 may also be provided to show which students are associated with a particular route to ensure that the students who are picked up are delivered to the right school or the right drop off location.

User interface 500 may also provide a user with a view of map 525, which may be changed or selected based on selecting a day (or plurality of days) from map interface buttons 530. Map 520 may illustrate route 535 for the new route selected in route information interface 505 and a plurality of stops 540A-540F shown in route stops interface 515. User interface 500 may further provide a list of unassigned riders 545 (or goods in other examples) who or which need to be assigned to route 535 or another route shown in route information interface 505 (e.g., another bus, in this example, which may be traveling through the area and could stop more efficiently/optimally, to pick up the unassigned students). When information has been reviewed through user interface 500, a user may choose to use control buttons 550 (e.g., a route update button) to update the route as shown and notify fleet routing system 100 of the update.

Figure 6:
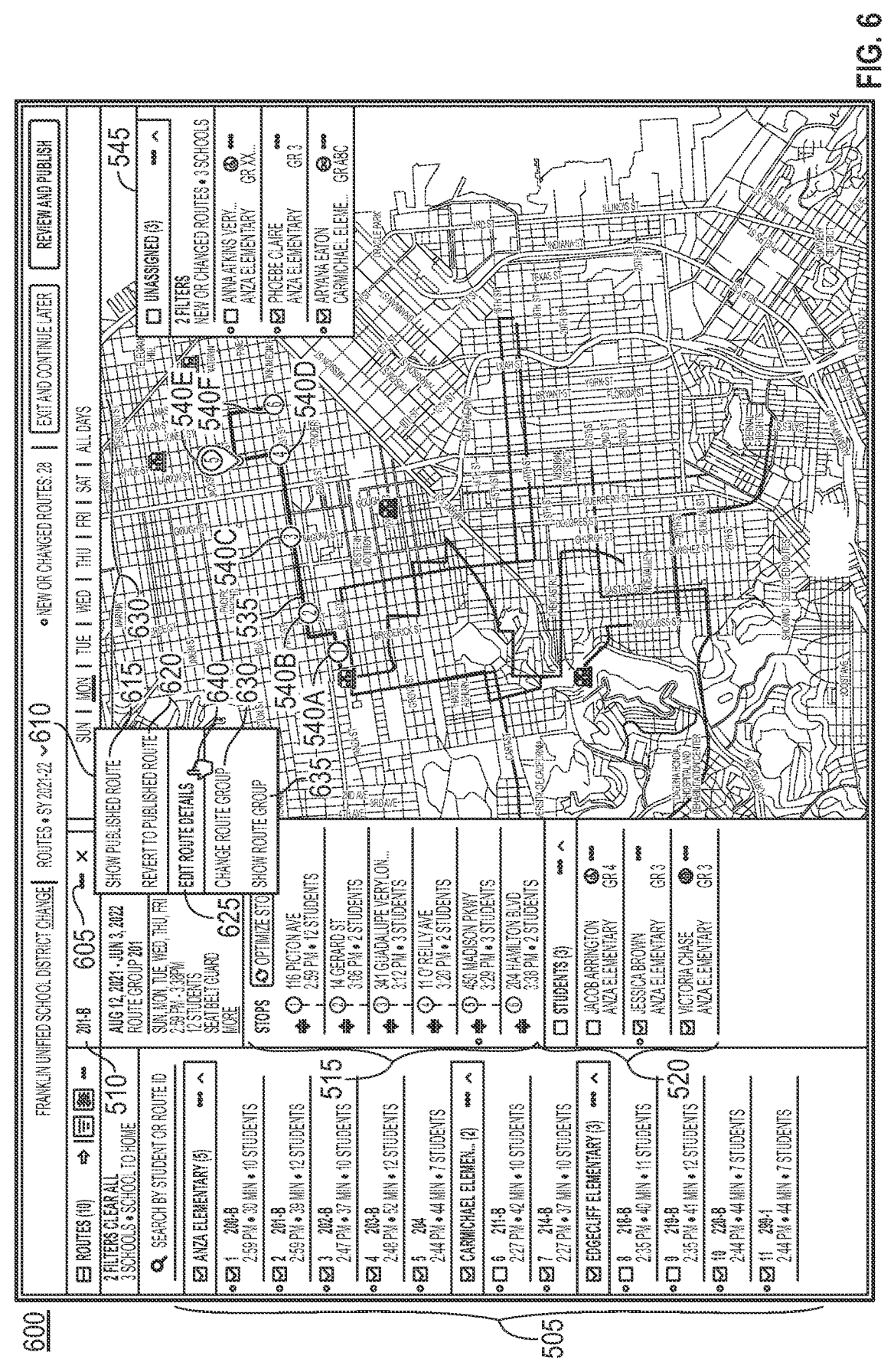

FIG. 6 illustrates an exemplary embodiment of a user interface 600 illustrating a view of fleet routes with menu for editing route details in fleet routing system 100. User interface 600 may be accessed from user interface 500 by interacting with a button, such as button 605 to create a menu 610 of actions which may be implemented by fleet routing system 100. For example, menu 610 may allow a user to request fleet routing system 100 show a published route 615, revert to a previously published route 620, edit route details 625, change a route group 630, or show a route group 635. As shown in FIG. 6, a provider/administrator/requestor user may select edit route details 625 by a selector 640. Menu 610 may be a dropdown menu which is accessible over user interface 500, shown in FIG. 5 and discussed above.

User interface 600 may also include the elements of user interface 500. For example, User interface 600 illustrates a view of all fleet routes for a particular entity. As previously discussed, an entity could be any governmental entity or company that operates a fleet of vehicles, although as shown in FIG. 5, an exemplary bus route is provided on, for example, a provider device 130 or an administrator device 125 where the administrator is an administrator of the entity. As shown in FIG. 6, a district administrator may view bus routes across a school district, although an individual school may also be shown and made available to a ride requestor device 110 through server 135 as well.

User interface 600 provides route information interface 505 for a plurality of elementary schools, including route 299-1, which was created as shown in FIG. 4, as route number 299-1 of route information interface 505. Route number 299-1 is selected as the desired information from route information interface 505. As such, detailed information for route 299-1 is provided in route details interface 299-1. Route details interface 510 provides information about the route creation date, the route group number, the requirements associated in terms of special education and wheelchair access. Route details interface 510 may also include information about the days of the week and times of the day that a particular rout is run, the duration of the route, the distance of the route, the number of students of the route and any more information available based on provider/administration interaction with route details interface 510.

Route stops information may be provided as route stops interface 515 which may provide a list of stops, in an optimized order for a particular route, which may be optimized, as discussed above. Student information interface 520 may also be provided to show which students are associated with a particular route to ensure that the students who are picked up are delivered to the right school or the right drop off location.

User interface 600 may also provide a user with a view of map 525, which may be changed or selected based on selecting a day (or plurality of days) from map interface buttons 530. Map 520 may illustrate route 535 for the new route selected in route information interface 505 and a plurality of stops 540A-540F shown in route stops interface 515. User interface 600 may further provide a list of unassigned riders 545 (or goods in other examples) who or which need to be assigned to route 535 or another route shown in route information interface 505 (e.g., another bus, in this example, which may be traveling through the area and could stop more efficiently/optimally, to pick up the unassigned students). When information has been reviewed through user interface 600, a user may choose to use control buttons 550 (e.g., a route update button) to update the route as shown and notify system 100 of the update.

Figure 7:
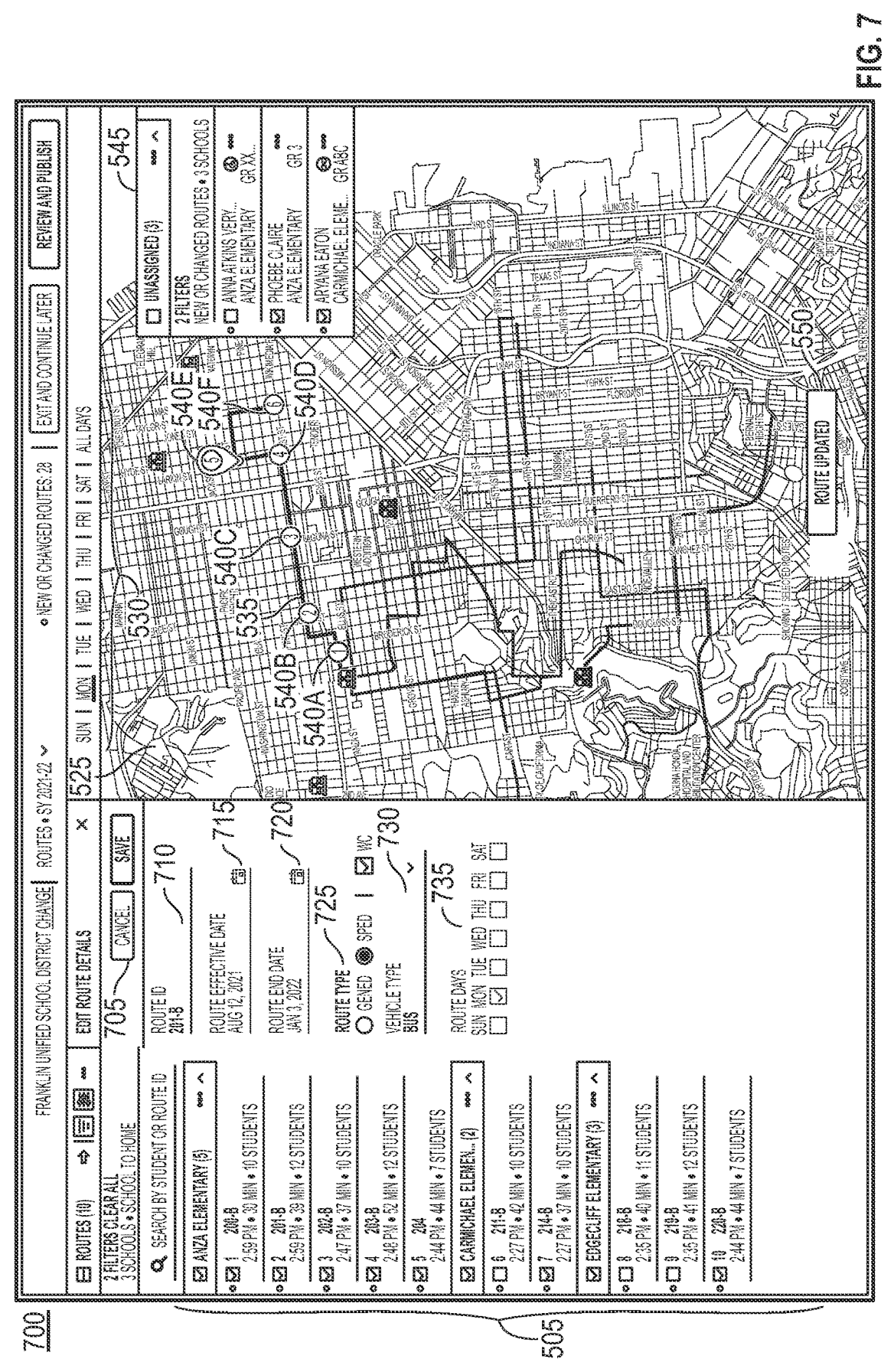

FIG. 7 illustrates an exemplary embodiment of a user interface 700 for editing route details in fleet routing system 100. User interface 700 provides a provider/administrator/ride requestor user an interactive interface to make edits to a particular route created within fleet routing system 100. User interface 700 provides route information interface 505 for a plurality of elementary schools, serviced by a particular school district, in this example. Route information interface 500 may provide a list of each route to and from a particular elementary school, a time the route starts, a duration of the route, and the number of students who ride on that route. Here, again, this disclosure is not limited to use with school buses but may be applied to any fleet of vehicles that deliver goods, services, or passengers, as discussed herein. User interface 700 may provide interfaces to allow a provider/administrator/ride requestor to edit a particular route.

User interface 700 includes control buttons 705 which, based on user interaction, allow a user to edit route details or information (e.g., a save edits button or a cancel button). User interface 700 may further include a route identification interface 710, a route effective date interface 715, and a route end date interface 720. A user may select and provide information to any one or all of route identification interface 710, a route effective date interface 715, and a route end date interface 720. User interface 700 may further allow a provider/administrator/ride requestor user to specify a route type for a particular route, including a general education route, a special ed route, or a wheelchair route at route type interface 725. In this case, route 201-B is selected for editing. The edit to route 201-B provides a bus through vehicle type interface 730 which is wheelchair capable for a special education route which runs on Mondays, through route day selection interface 735.

User interface 700 may further include a user with a view of map 525, which may be changed or selected based on selecting a day (or plurality of days) from map interface buttons 530. Map 520 may illustrate route 535 for the new route selected in route information interface 505 and a plurality of stops 540A-540F shown in route stops interface 515. User interface 600 may further provide a list of unassigned riders 545 (or goods in other examples) who or which need to be assigned to route 535 or another route shown in route information interface 505 (e.g., another bus, in this example, which may be traveling through the area and could stop more efficiently/optimally, to pick up the unassigned students). When information has been reviewed through user interface 600, a user may choose to use control buttons 550 (e.g., a route update button) to update the route as shown and notify fleet routing system 100 of the update.

Figure 8:
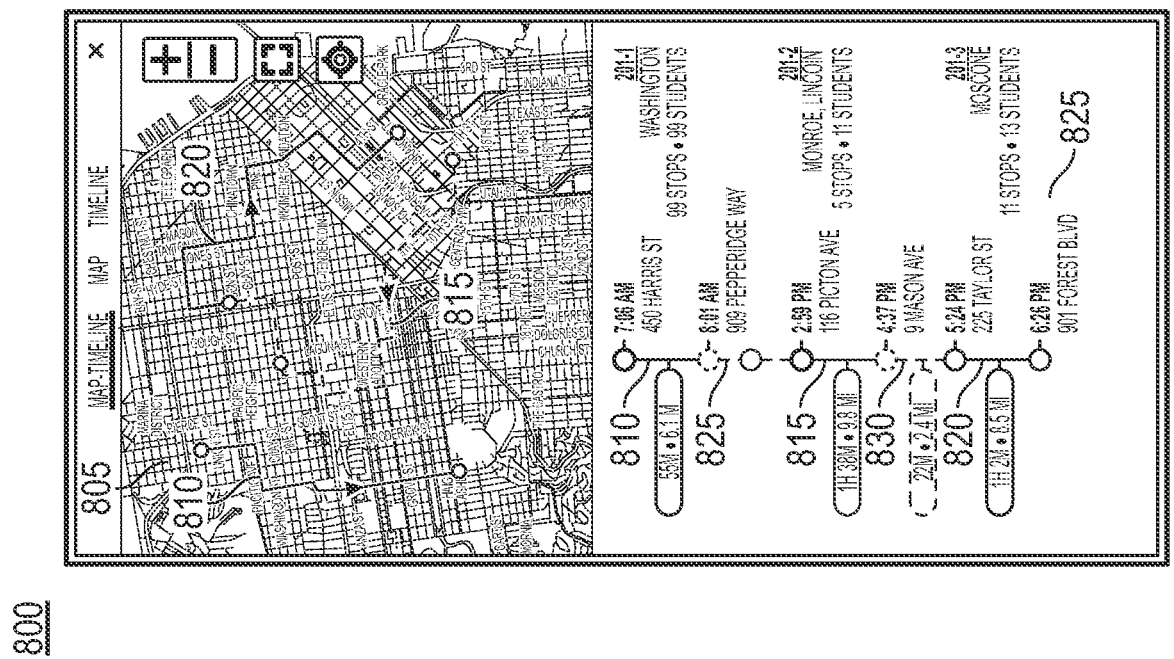
FIG. 8 illustrates an exemplary embodiment of a user interface illustrating a map with route identification and timing in the fleet routing system.

FIG. 8 illustrates an exemplary embodiment of a user interface 800 illustration a map 800 with route identification and timing in fleet routing system 100. User interface 800 may be provided based on creating a new route, as discussed with respect to FIG. 5 or may be provided based on editing a previously established route, as discussed with respect to FIG. 7. User interface 800 may further be provided to any of ride requestor device 110, user device 115, driver device 120, administrator device 125, or provider device 130 by server 135 through communications network 105.

User interface 800 illustrates a map-timeline, as previously discussed with respect to FIG. 4. As shown in user interface 800, map 805 and timeline view 825 are illustrated together. Map 805 includes a view of each route associated with route 201, such as route 201-1 810, route 201-2 815, and route 201-3 820. Timeline view 825 illustrates that route 201-1 (element number 810) begins at 7:06 AM at 450 Harris St., has a duration of 55 minutes over a distance of 6.1 miles and has 99 stops with 99 students, as merely an explanatory route. Route 201-1 ends at 8:01 AM at 909 Pepperidge Way and begins to travel (element 830) to the next pickup location at 2.59 PM at 116 Picton Avenue for route 201-2. At 116 Picton Avenue, route 201-2 commences (element 815) to drive for 1 hour and 38 minutes over a distance of 9.8 miles across 5 stops for 11 students. Route 201-2 ends at 9 Mason Avenue at 4:37 PM. Once the children are dropped off from the school bus, the driver may travel to 225 Taylor Street by 5:24 PM over a duration of 22 minutes and a distance of 2.4 miles (element 835). At 225 Taylor Street, route 201-3 begins to pick up 13 students and drop them off at 11 stops over a duration of 1 hour and 2 minutes and a distance of 8.5 miles to 901 Forest Boulevard at 6:26 PM. Timeline view 460 may be color coded such that route 201-1 (element 810) may be blue, route 201-2 (element 815) may be purple, and route 201-3 (element 820) may be orange, for example. A start and stop location may also be color coded to indicate which location is a start location and which location is a stop location for a particular route The color coding may be used on a map 805 view and in timeline view 825 as the same color for representative consistency. It is noted that the color coding discussed herein is merely exemplary and any route in map 805 or timeline view 825 can be designated in any color so long as there is consistency in color for the same route shown in map 805 and in timeline view 825.

The foregoing description has been presented for the purposes of illustration and description. It is not intended to be exhaustive or to limit the disclosure to the precise form disclosed. Many modifications and variations are possible in light of the above disclosure and teachings. Further, it should be noted that any or all of the aforementioned alternate implementations may be used in any combination desired to form additional hybrid implementations of the disclosure. For example, components described herein may be removed and other components added without departing from the scope or spirit of the embodiments disclosed herein or the appended claims.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A graphical user interface displayed on a device screen by a processor, comprising:
    a route identification interface element which specifies a new route for a vehicle in a fleet of vehicles;
    a plurality of route type buttons in the graphical user interface;
    a vehicle type interface comprising a list of types of vehicles to select for the vehicle in the fleet of vehicles;
    a stop order interface, identifying one or more stops for the vehicle in a fleet of vehicles along for the new route;
    a map, the map including a graphical display of the new route and the one or more stops for the vehicle in the fleet of vehicles along the new route;
    a control button selectable for providing a utilization view in place of the map for one or more vehicles in the fleet of vehicles, the utilization view including a graphical representation of one or more vehicles in the fleet of vehicles which is available to drive the new route during a specified time on a specified day, the availability of the one or more vehicles in the fleet of vehicles being identified by one or more utilization indicators which are representative of one of the one or more vehicles in the fleet of vehicles being scheduled to service an assigned route, and
        wherein the utilization indicators are color coded by the processor to identify the vehicle among the one or more vehicles in the fleet of vehicles that are available for the specified time on the specified day,
        wherein the processor determines how the new route affects the assigned route for one of the one or more vehicles in the fleet of vehicles, and
        wherein the processor automatically augments the graphical user interface timeline view on the display screen with the new route in the timeline view, new stop locations, and new stop times; and
    an assignment button, accessible through the graphical user interface, which assigns the new route to the vehicle among the one or more vehicles in the fleet of vehicles and causes the route to be published to a fleet routing system.

2. The system of claim 1, wherein the control button for accessing a utilization view for one or more vehicles in the fleet of vehicles comprises providing a utilization view based on viewing all routes in a fleet routing system.

3. The graphical user interface displayed on a device screen of claim 1, wherein the control button for accessing a utilization view for one or more vehicles in the fleet of vehicles comprises providing a utilization view based on route groups in the fleet routing system that can accommodate the new route.

4. The graphical user interface displayed on a device screen of claim 1, wherein the utilization indicators further identify that a route is available but impractical due to time constraints on the new route in view of other scheduled routes for that vehicle among the fleet of vehicles.

5. The graphical user interface displayed on a device screen of claim 1, further comprising a timeline view which identifies the new route.

6. The graphical user interface displayed on a device screen of claim 5, wherein timeline view includes another route previously assigned to the vehicle.

7. The graphical user interface displayed on a device screen of claim 6, wherein the timeline view includes a start time and a start location for each route for the vehicle.

8. The graphical user interface displayed on a device screen of claim 7, wherein the timeline view includes an end time and an end location for each route for the vehicle.

9. The graphical user interface displayed on a device screen of claim 8, wherein each route for the vehicle is color coded in the timeline view.

10. The graphical user interface displayed on a device screen of claim 1, further comprising a map with color coded route indicators which specify each route for the vehicle.

11. A system, comprising:
a processor implementing a graphical user interface displayed on a device screen associated with a user, the user being one of a provider, an administrator, and a ride requestor, the graphical user interface further comprising:
a route identification interface element which specifies a new route for a vehicle in a fleet of vehicles;
a plurality of route type buttons in the graphical user interface;
a vehicle type interface comprising a list of types of vehicles to select for the vehicle in the fleet of vehicles;
a stop order interface, identifying one or more stops for the vehicle in a fleet of vehicles along for the new route;
a map, the map including a graphical display of the new route and the one or more stops for the vehicle in the fleet of vehicles along the new route;
a control button selectable for providing a utilization view in place of the map for one or more vehicles in the fleet of vehicles, the utilization view including a graphical representation of one or more vehicles in the fleet of vehicles which is available to drive the new route during a specified time on a specified day, the availability of the one or more vehicles in the fleet of vehicles being identified by one or more utilization indicators which are representative of one of the one or more vehicles in the fleet of vehicles being scheduled to service an assigned route, and
wherein the utilization indicators are color coded to identify the vehicle among the one or more vehicles in the fleet of vehicles that are available for the specified time on the specified day,
wherein the processor determines how the new route affects the assigned route for the one of the one or more vehicles in the fleet of vehicles, and
wherein the processor automatically augments the graphical user interface timeline view on the display screen with the new route in the timeline view, new stop locations, and new stop times; and
an assignment button, accessible through the graphical user interface, which assigns the new route to the vehicle among the one or more vehicles in the fleet of vehicles in the fleet routing system and causes the route to be published to a fleet routing system.

12. The system of claim 11, wherein the control button for accessing a utilization view for one or more vehicles in the fleet of vehicles comprises providing a utilization view based on viewing all routes in the fleet routing system.

13. The system of claim 11, wherein the control button for accessing a utilization view for one or more vehicles in the fleet of vehicles comprises providing a utilization view based on route groups in the fleet routing system that can accommodate the new route.

14. The system of claim 11, wherein the utilization indicators further identify that a route is available but impractical due to time constraints on the new route in view of other scheduled routes for that vehicle among the fleet of vehicles.

15. The system of claim 11, further comprising a timeline view which identifies the new route and another route previously assigned to the vehicle.

16. The system of claim 15, wherein timeline view includes another route previously assigned to the vehicle.

17. The system of claim 16, wherein the timeline view includes a start time and a start location for each route for the vehicle.

18. The system of claim 17, wherein each route for the vehicle is color coded in the timeline view.

19. The system of claim 11, further comprising a map with color code route indicators which specify each route for the vehicle.

20. The system of claim 11, wherein one or more of a timeline view and a map view including color coded route indicators are provided to a driver device through a communication device by a server device.

* * * * *